United States Patent [19]

Hass

[11] 4,411,320
[45] Oct. 25, 1983

[54] EDGING TOOL

[75] Inventor: Richard M. Hass, Portland, Oreg.

[73] Assignee: Phyllis W. Hass, Tigard, Oreg.

[21] Appl. No.: 356,119

[22] Filed: Mar. 8, 1982

[51] Int. Cl.³ .......................... A01B 3/06; A01B 1/12
[52] U.S. Cl. .................................. 172/13; 172/380; 30/315
[58] Field of Search ............ 172/13, 14, 18, 380, 172/378, 379; 30/314, 315, 317, DIG. 5

[56] References Cited

U.S. PATENT DOCUMENTS

| | | | |
|---|---|---|---|
| 64,442 | 5/1867 | Nelson. | |
| 111,240 | 1/1871 | Parkman. | |
| 808,168 | 12/1905 | Reed. | |
| 836,541 | 11/1906 | Spriggs | 30/315 |
| 1,568,484 | 1/1926 | Tolman. | |
| 1,885,089 | 10/1932 | Dukes | 172/380 |
| 2,343,616 | 3/1944 | Kay | 30/315 X |
| 2,795,045 | 6/1957 | Taylor | 30/DIG. 5 |
| 3,015,930 | 1/1962 | Campbell | 30/314 |
| 4,208,793 | 6/1980 | Sinnott | 30/315 |

FOREIGN PATENT DOCUMENTS 905081 9/1962 United Kingdom .................. 172/13

Primary Examiner—Richard J. Johnson

[57] ABSTRACT

A flat blade is mounted on a handle and has upper and lower edges. The lower edge consists of a pair of cutting edges leading upwardly from a central point at an angle to each other and the upper edge consists of a pair of stepping edges leading downwardly from each other from a central point. The stepping edges are substantially parallel to the opposite cutting edge. The cutting edges have scallop-type serrations formed by defining edges extending substantially at ninety degrees to each other.

1 Claim, 6 Drawing Figures

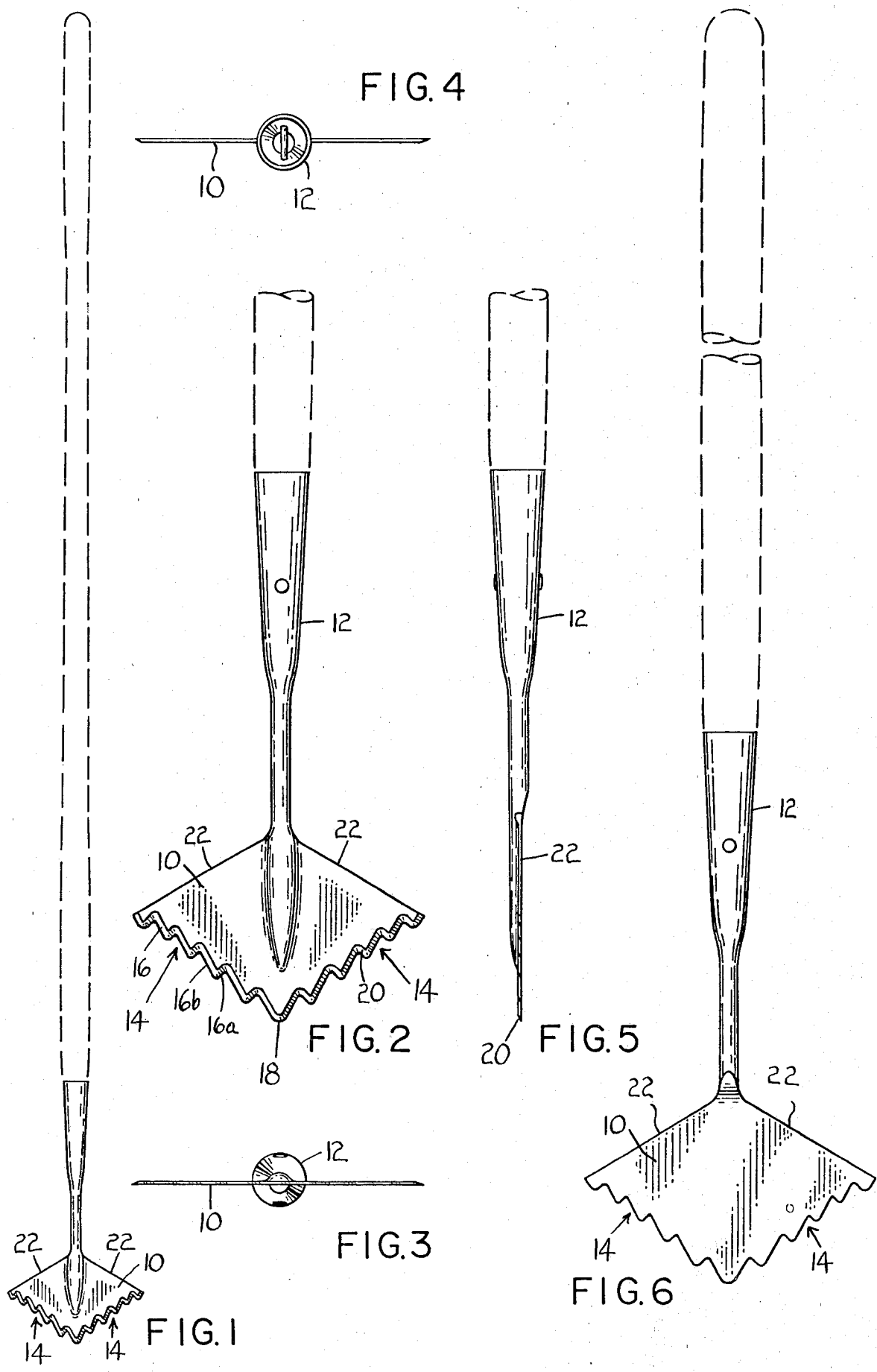

EDGING TOOL

BACKGROUND OF THE INVENTION

This invention relates to new and useful improvements in edging tools.

The tool constitutes an improvement over existing hand-type tools for edging lawns or the like. Various types of tools have been designed for this purpose. One such tool has an arcuate bottom cutting edge and horizontal top stepping edges on opposite sides of a handle. This type of tool is difficult to use since an unbalanced force is applied thereto when the stepping edge is engaged by the foot. That is, the stepping edge are at right angles to the handle and on opposite sides thereof whereby a downward pressure by the foot on one side produces an oblique reaction on the handle. This makes the tool unbalanced and difficult to use. The arcuate cutting edge on these conventional tools also is not very effective for trimming or cutting since it readily slides off edges in the soil. Furthermore, such tools cannot conveniently be used for other purposes around the home.

SUMMARY OF THE INVENTION

A primary objective of the invention is to provide an edging tool having a structure providing efficient balance in use and one which is capable of many functions including edging lawns or the like, loosening soil, scalping soil, removing weeds, and other uses.

The objectives of the invention are accomplished by employing a flat blade attached to a handle and having upper and lower edges. The lower edge consists of a pair of cutting edges leading upwardly at an angle from a central point. The upper edge consists of a pair of stepping edges leading downwardly from the handle and being substantially parallel with the opposite upwardly angled cutting edge. The cutting edges have scallop-shaped teeth with each tooth being formed by a pair of defining edges the first of which extends laterally of the blade and the other of which extends approximately ninety degrees relative to the first edge somewhat along the general line of the cutting edge but angled inwardly to meet the inner or base of the next upper tooth.

The invention will be better understood and additional objects and advantages will become apparent from the following description taken in connection with the accompanying drawing.

BRIEF DESCRIPTION OF THE DRAWINGS

FIG. 1 is an elevational view of the tool embodying features of the invention;

FIG. 2 is an enlarged face view of one side of the tool blade;

FIG. 3 is a bottom plan view of the tool;

FIG. 4 is a top plan view;

FIG. 5 is a side elevational view; and

FIG. 6 is a view similar to FIG. 2 but taken from the opposite side of the blade.

DETAILED DESCRIPTION OF A PREFERRED EMBODIMENT

With particular reference to the drawings, the invention comprises a flat blade 10 connected at its upper end to a handle socket 12. The blade is of suitable thickness to withstand the forces of edging, soil loosening, and other gardening functions.

With particular reference to FIG. 2 the bottom of the blade has a pair of cutting edges 14 leading upwardly at an angle, namely, at about ninety degrees from each other and at about forty-five degrees relative to the handle. These edges are provided with scallop-shaped teeth 16 and lead from a central, symmetrically shaped tooth 18. Each of the teeth 16 has a first cutting edge 16a extending laterally of the blade and a cutting edge 16b extending approximately ninety degrees to the edge 16a but angled inwardly relative to the general line of edge 14 to meet and form the edge 16a of the next upper tooth. Edges 16a and 16b of the same tooth join each other in a rounded corner 16c. Teeth 16 are beveled at 20 to provide the cutting edges.

The top of the blade 20 includes a pair of downwardly angled foot engaging or stepping edges 22. These edges extend substantially parallel to the opposite cutting edge 14 forming a blade shaped like a rhomboid type parallelogram. The edges 16a extend substantially parallel with the edge 22 on the same side thereof.

The tool has many uses. For example, it may be used as an edging tool for lawns or gardens. The angled cutting edges 14 and the particular shape of the teeth 16 provide easy penetration into the ground. That is, the upward angled edges 14 and the central pointed tooth 18 provide a progressive ground penetration from the tooth 18 upward so that minimum effort is necessary to push the tool straight down into the ground. The edges 16a of the teeth also provide a cutting action for such progressive penetration, with the elongated edges 16b providing a shearing action to the grass and ground also to contribute to the easy penetration into the ground. These toothed edges, by reason of the shape of the teeth, prevent the edge from slipping off thin edge cuts and thus a true edge is easily made.

When the device is used to make a new edge wherein a vertical cut is made and then sod removed from the cut, the tool can be manipulated so that an uppermost portion of one of the edges 14, namely, using one or more of the uppermost teeth 16, can be used to make a horizontal cut under the sod that has been separated by the vertical cut. The shape of the teeth provides easy cutting away of the sod in such edging function because the edges 16a in their angular disposition provide the proper cutting angle relative to the handle for pushing this portion of the tool through the sod.

Due to the substantially parallel relation of the stepping edges 22 relative to their opposite cutting edges 14, foot pressure can, by suitable manipulation of the tool, be applied directly from a stepping edge 22 to the opposite cutting edge 14. If necessary, the tool can be angled over to one side to provide a straight down stepping force.

The tool may also be used in vegetable or flower gardens in soil loosening or scalping functions. Although the lateral dimension of the blade 10 may vary, it is preferred that it have a rather narrow width, such as 4–6 inches, whereby it can be worked in narrow areas such as between flowers or shrubs. The tool is equally adaptable for edging straight or curved edges.

It is to be understood that the form of my invention herein shown and described is to be taken as preferred example of the same and that various changes in the shape, size and arrangement of parts may be resorted to without departing from the spirit of my invention, or the scope of the subjoined claims.

Having thus described my invention, I claim:

1. An edging tool comprising
   (a) a flat blade having upper and lower edges,
   (b) a handle secured to said blade centrally of the upper edge thereof,
   (c) said lower edge consisting of a pair of cutting edges leading upwardly from a central point at an angle to each other,
   (d) said upper edge consisting of a pair of straight stepping edges leading downwardly from said handle at an angle to each other,
   (e) said stepping edges being substantially parallel with the opposite cutting edge,
   (f) said cutting edges comprising scallop-type serrations formed by a pair of defining edges extending substantially at 90° to each other,
   (g) a first of said defining edges leading laterally of said blade in a direction substantially parallel with said stepping edge on the same side thereof and said other defining edge extending at approximately 90° from said first defining edge and also inwardly of said cutting edge.

* * * * *